G. J. LONG.
KITCHEN UTENSIL.
APPLICATION FILED JULY 23, 1920.
1,370,752.
Patented Mar. 8, 1921.
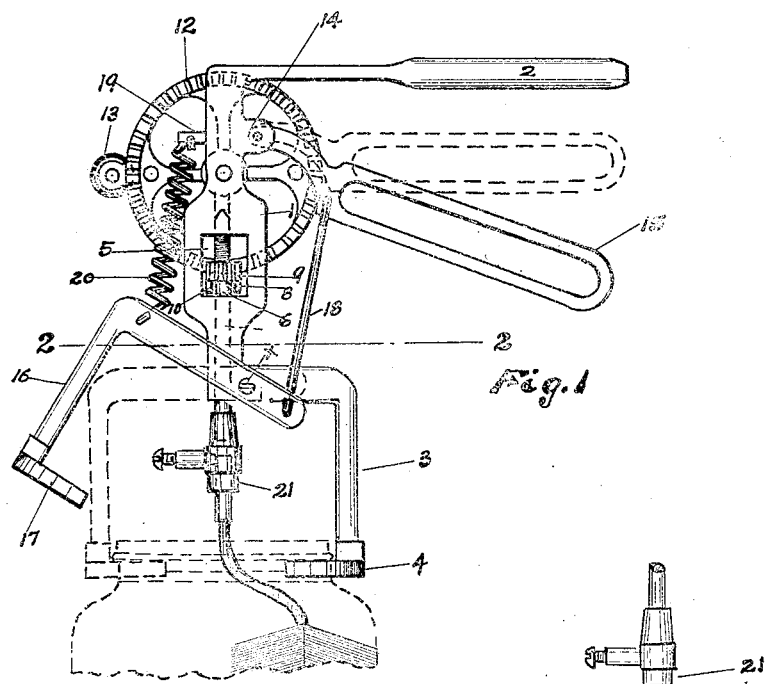
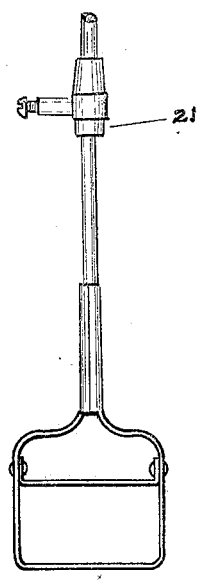
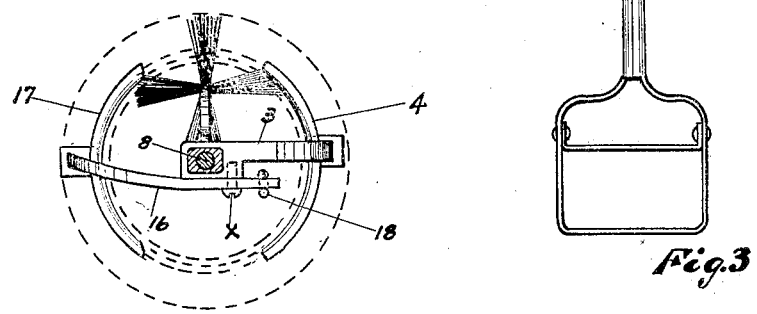
Witnesses
Inventor
George J. Long.
By his Attorney.

UNITED STATES PATENT OFFICE.

GEORGE J. LONG, OF CHICAGO, ILLINOIS.

KITCHEN UTENSIL.

1,370,752.  Specification of Letters Patent.  Patented Mar. 8, 1921.

Application filed July 23, 1920. Serial No. 398,339.

*To all whom it may concern:*

Be it known that I, GEORGE J. LONG, a citizen of the United States, and a resident of the city of Chicago, county of Cook, and State of Illinois, have invented certain new and useful Improvements in Kitchen Utensils, of which the following is a specification.

My invention relates to new and useful improvements in kitchen utensils, and has for its primary object the provision of a utensil of such construction as to be adaptable for use as a jar washer, egg beater, butter churn, and other such kitchen utensils. Another object of the invention is the provision of a clamping device of such a construction as to readily enable the user to clamp and release the utensil to and from a receptacle such as a jar or small glass churn.

Other objects will appear hereinafter.

The invention consists in the combinations and arrangements of parts hereinafter described and claimed.

The invention will be best understood by reference to the accompanying drawings forming a part of this specification, and in which, Figure 1, is a side elevation of a utensil embodying the invention, with a portion of the brush attachment broken away, Fig. 2, a cross-sectional view taken on line 2—2 of Fig. 1, and Fig. 3, a side elevation of an egg beater.

The preferred form of construction, as illustrated in the drawings, comprises a metal base member 1, to which is fixedly attached, by any convenient means, a palm handle 2 and an L-shaped clamp arm 3, to which in turn is attached a clamp jaw 4 which is of such contour as to firmly grasp the neck of the receptacle to which it is to be attached. The base member 1 is provided with a cut-out portion 5 and a drilled shaft way 6. The shaft 8 is threaded at its upper end and is adapted to receive the threaded gear 9, the ends of the threads on the shaft 8 acting as a stop for the gear 9. Extending from and integral with the gear 9 are lugs 10, which act as bearing members for the revolving gear 9 and serve to hold the gear teeth of the gear 9 in alinement and in mesh with the gear teeth of the driving gear 12. The driving gear 12 is mounted upon the base member 1 by means of a screw, or other similar means, and is revolved by the handle 13, the operation being the same as that of the ordinary egg beater. The base member 1 is provided with a lateral standing lug 14, to which is pivotally attached a hand lever 15. An L-shaped member 16, substantially of the same size as the member 3 and having a clamp jaw 17 corresponding to the clamp jaw 4 is fulcrumed upon the base member 1 at a point X. A rod 18 connects the hand clamp 15 and the jaw member 16, as indicated in Fig. 1. Extending from a lug 19 near the top of the base member 1 to the heel of the L-shaped member 16 is a tension spring 20, which acts to release the jaw from the receptacle when the handle 15 is released. Fixed to the end of the shaft 8 is a socket 21 which may be of any desirable construction.

In Fig. 1 I have shown a jar or bottle washing brush attached to the socket, said bottle washing brush consisting of an offset wire brush which is adapted to revolve about the inside face of the jar.

The operation of the device is as follows:—The jaw 4 is placed against the neck of the receptacle, and upon pressure being applied to the lever arm 15 the fulcrum clamp member 16 will force the jaw 17 against the opposite side of the receptacle, thus holding the revolving implement firmly within the receptacle and the implement-holding means directly centering the opening of the receptacle. Upon the revolving of the large gear 12, the meshed gear 9 which is fixed to the shaft 8 will revolve said shaft 8, which in turn revolves socket 21 and the implement within the receptacle. Another implement which can be used in connection with the utensil is an egg beater, such as shown in Fig. 3, which consists of a metal shaft having oppositely extending wire straps at one end, said straps being joined together and being of such contour as to readily enter the neck of the receptacle. Extending between the sides of said egg beater is another metal strip, which is firmly riveted to said sides.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A device of the class described comprising a pair of coöperating jaws adapted to engage a receptacle; hand-engaged means to retain said jaws clamped on the receptacle; and means mounted on said jaws adapted to hold and revolve an implement in said receptacle, substantially as described.

2. A device of the class described comprising a clamp adapted to engage a receptacle; a fixed jaw and a pivoted jaw on said clamp; manual means to retain said jaws clamped upon the receptacle; automatic means to release said clamp; revolving implement holding means extending between the jaws of said clamp; and operating means adapted to operate an implement within the receptacle, substantially as described.

3. A device of the class described, comprising a base member, a clamp jaw fixed to said member; a clamp jaw pivoted to said member; a lever pivoted to said member and operatively connected to said pivoted jaw to retain said jaws clamped upon a receptacle; spring means to automatically release said pivoted jaw upon release of said lever; a drive shaft extending through the base member; implement retaining means upon the lower end of said shaft; and gear means adapted to actuate said shaft and revolve an implement within the receptacle, substantially as described.

4. A device of the class described comprising a base member; a laterally extending palm grip; a finger grip pivotally connected to the base member; a fixed clamp member; a fulcrumed clamp member pivotally connected to the finger grip; a drive shaft extending through the base member; a gear on said drive shaft extending through the base member; a gear on said drive shaft; a large drive gear positioned upon the base member and meshing with the drive shaft gear; a tension spring connecting the upper part of the base with the fulcrum jaw member; and an implement socket upon the lower end of the drive shaft, substantially as described.

5. A device of the class described comprising a clamp adapted to engage a receptacle circumferentially; a fixed jaw and a pivoted jaw on said clamp, both of said jaws being curved inwardly; manual means to retain said jaws clamped on the receptacle; automatic means to release said clamp; revolving implement holding means extending between the jaws of said clamp; and operating means adapted to operate an implement within the receptacle, substantially as described.

In testimony whereof I have signed my name to this specification in the presence of two subscribing witnesses.

GEORGE J. LONG.

Witnesses:
 JOSHUA R. H. POTTS,
 ROSE K. TRIB.